(12) United States Patent
Staton et al.

(10) Patent No.: US 11,194,216 B1
(45) Date of Patent: Dec. 7, 2021

(54) DRIVER FOR IMAGE-ALTERING STATIC PROGRAMMABLE ELECTRO-CHROMIC PARTICLES AND DISPLAY SYSTEMS HAVING SAME

(71) Applicant: NEWTONOID TECHNOLOGIES, L.L.C., Liberty, MO (US)

(72) Inventors: Fielding B. Staton, Liberty, MO (US); David Strumpf, Columbia, MO (US)

(73) Assignee: Newtonoid Technologies, L.L.C., Liberty, MO (US)

(*) Notice: Subject to any disclaimer, the term of this patent is extended or adjusted under 35 U.S.C. 154(b) by 308 days.

(21) Appl. No.: 16/449,927

(22) Filed: Jun. 24, 2019

Related U.S. Application Data (60) Provisional application No. 62/689,039, filed on Jun. 22, 2018.

(51) Int. Cl.
*G02F 1/163* (2006.01)
(52) U.S. Cl.
CPC .................... *G02F 1/163* (2013.01)
(58) Field of Classification Search
CPC ...................................... G02F 1/163
See application file for complete search history.

(56) References Cited

U.S. PATENT DOCUMENTS

| | | | |
|---|---|---|---|
| 2015/0085341 A1* | 3/2015 | Ash | G02F 1/163 359/275 |
| 2017/0131611 A1* | 5/2017 | Brown | G02F 1/163 |
| 2019/0163947 A1* | 5/2019 | Bawolek | G02F 1/163 |

* cited by examiner

*Primary Examiner* — Cara E Rakowski
(74) *Attorney, Agent, or Firm* — Avant Law Group, LLC (57) ABSTRACT

A SPEC particle driver is operable with an input for a current-essential display having activated and deactivated states. The driver has a current switching mechanism (CSM), a power return system (PRS), and a processor. The CSM is in electrical communication with the SPEC particle for changing a direction of current received by the SPEC particle between first and second directions. The PRS is in electrical communication with a power source for storing energy received therefrom, and in electrical communication with the CSM and the SPEC particle for providing current thereto. When the input signals for the activated state, the processor causes the SPEC particle to receive current from the power source in the first direction and present a first appearance. When the input signals for the deactivated state, the processor causes the SPEC particle to receive current from the PRS in the second direction and present a second appearance.

21 Claims, 9 Drawing Sheets

DRIVER FOR IMAGE-ALTERING STATIC PROGRAMMABLE ELECTRO-CHROMIC PARTICLES AND DISPLAY SYSTEMS HAVING SAME

RELATED APPLICATIONS

This application claims priority to U.S. Provisional Patent Application Ser. No. 62/689,039, filed Jun. 22, 2018, the disclosure of which is incorporated herein in its entirety by reference.

FIELD OF THE INVENTION

The current invention relates to image-altering particles, and particularly to apparatus and methods for controlling such particles.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

According to one embodiment, a display system has a current-essential (CE) display, a CE power supply, a SPEC particle, a current switching mechanism, a power return system, and an input. The CE display has an activated state and a deactivated state, and the CE display only remains in an activated state while receiving current. The CE power supply is in electrical communication with the CE display for selectively providing current to the CE display to alter the CE display between the activated and deactivated states. The SPEC particle presents a first appearance upon receiving current in a first direction and a second appearance upon receiving current in a second direction, with the first appearance being different from the second appearance and the second direction being different from the first direction. The SPEC particle changes appearance only upon receiving a change in current direction, and the SPEC particle is in electrical communication with a power source that is either the CE power supply or a separate SPEC power supply. The current switching mechanism is in electrical communication with the SPEC particle for selectively changing the direction of current received by the SPEC particle between the first direction and the second direction. The power return system is in electrical communication with the current switching mechanism and the SPEC particle for selectively providing current to the current switching mechanism and the SPEC particle. The input has a first condition and a second condition, and the input being at the first condition causes the CE power supply to provide current to the CE display, the CE display to remain in the activated state, the SPEC particle to receive current from the power source in the first direction, and the SPEC particle to present the first appearance. The input being at the second condition causes the CE power supply to not provide current to the CE display, the CE display to be in the deactivated state, the SPEC particle to receive current from the power return system in the second direction, and the SPEC particle to present the second appearance.

According to another embodiment, a display system has a SPEC particle, a power supply in electrical communication with the SPEC particle, a current switching mechanism, a power return system, and an input having a first condition and a second condition. The SPEC particle presents a first appearance upon receiving current in a first direction and a second appearance upon receiving current in a second direction (with the first appearance being different from the second appearance and the second direction being different from the first direction), and the SPEC particle changes appearance only upon receiving a change in current direction. The current switching mechanism is in electrical communication with the SPEC particle for selectively changing the direction of current received by the SPEC particle between the first direction and the second direction. The power return system is in electrical communication with the current switching mechanism and the SPEC particle for selectively providing current to the current switching mechanism and the SPEC particle. The input being at the first condition causes the SPEC particle to receive current from the power source in the first direction and the SPEC particle to present the first appearance. The input being at the second condition causes the SPEC particle to receive current from the power return system in the second direction and the SPEC particle to present the second appearance.

According to yet another embodiment, a driver is provided for a SPEC particle. The driver is operable with an input for a current-essential display having an activated state and a deactivated state and only remaining at the activated state when receiving current, and the driver has a current switching mechanism, a power return system, and a processor. The current switching mechanism is in electrical communication with the SPEC particle for selectively changing a direction of current received by the SPEC particle between a first direction and a second direction. The power return system is in electrical communication with a power source for storing energy received from the power source, and the power return system is in electrical communication with the current switching mechanism and the SPEC particle for selectively providing current to the current switching mechanism and the SPEC particle. When the input signals for the activated state, the processor causes the SPEC particle to receive current from the power source in the first direction such that the SPEC particle presents a first appearance. When the input signals for the deactivated state, the processor causes the SPEC particle to receive current from the power return system in the second direction such that the SPEC particle presents a second appearance.

According to still another embodiment, a method is provided for modifying a display system having a power source, a current-essential (CE) display, and an input having signals for changing the CE display between an activated state and a deactivated state. The method includes providing a SPEC particle and providing a driver. The driver has a current switching mechanism, a power return system, and a processor. The current switching mechanism is in electrical communication with the SPEC particle for selectively changing a direction of current received by the SPEC particle between a first direction and a second direction. The power return system is in electrical communication with the current switching mechanism and the SPEC particle for selectively providing current to the current switching mechanism and the SPEC particle. The processor has programming that causes, when the input signals for the activated state, the SPEC particle to receive current from the power source in the first direction such that the SPEC particle presents a first appearance. And the processor has programming that causes, when the input signals for the deactivated state, the SPEC particle to receive current from the power return system in the second direction such that the SPEC particle presents a second appearance.

DETAILED DESCRIPTION

Image-altering static programmable electro-chromic (SPEC) particle technology (also referred to as electronic paper or electronic paper displays) may provide many useful advantages over other electronic displays such as liquid crystal displays (LCDs), light-emitting diode displays (LEDs), incandescent-backlit displays, electroluminescent displays (ELDs), plasma display panels (PDPs), liquid crystal displays (LCDs), high-performance addressing displays (HPAs), thin-film transistor displays (TFTs), organic light-emitting diode displays (OLEDs), digital light processing displays (DLPs), cathode ray tube displays (CRTs), current seven-segment displays, et cetera. For example, electronic paper may create a display that does not require backlighting, while other electronic displays may require it. Not requiring a backlight means that electronic paper displays utilize reflective light and may be visible in bright sunlight where other electronic displays may appear to fade.

Another advantage of electronic paper displays is that that they require less power than conventional electronic displays. Electronic displays such as LEDs require constant power to continuously transmit an image. Electronic paper displays only require an electric field to change the image being displayed, not to maintain it. So electronic paper displays may have significantly decreased power consumption compared to other electronic displays. Still further, electronic paper displays may produce less heat than other displays. Heat in the context of displays is typically an undesirable byproduct.

Unfortunately, the feature of electronic paper that leads to its incredibly low power consumption is the very feature that also limits its applicability. Since electronic paper requires the application of an electric field in order to rearrange its display by turning, or otherwise altering, SPEC particles, this limits its usage in technology where applying a changing electric field could be problematic. For example, electronic paper has not been an appropriate display for use as vehicle brake lights. When an automobile's brakes are applied in order to stop, an electronic signal is typically sent to the brake lights (which are typically incandescent-backlit displays or LED displays), actuating the brake lights in order to indicate that the vehicle is stopping. Using electronic paper displays as brake lights has been unacceptable; the electronic paper requires a discrete electrical signal to change state, but there is no secondary signal associated with the brake pedal.

Various embodiments of the current invention include drivers for image-altering SPEC particles and systems using such drivers. The drivers may alter the state of the SPEC particles without the use of a secondary signal, and various embodiments may resolve the issue of electronic paper screens being unintentionally latched into one state after having been sent an electronic signal.

A SPEC particle is a component of electronic paper technology, and may for example include a plurality of "beads" the width of a human hair. Each bead may contain different colors of ink inside (often, though not necessarily, black and white) and each of these different colors of ink may carry opposite electrical charges. For example, all of the white ink may be positively charged, and all of the black ink may be negatively charged. These beads may have one or more adjacent electrode layers that provide a positive or negative charge in segments along the plurality of beads. These segments may attract the oppositely charged ink in the beaded region, and repulse the same charged ink. This results in the beads rearranging themselves according to an applied, targeted electrical field. This rearrangement may be minutely controlled through application of the targeted electric field. Ultimately, this process may result in layers of beads being arranged with a certain desired side of ink facing the direction from which the screen may be viewed, providing an image for the viewer. The beads remain in their positions even after the electrical field is no longer provided, thus retaining their displayed image, which is a distinct difference from conventional electronic displays. This kind of display may also be referred to as electronic ink display, or microencapsulated electrophoretic displays.

Figure 1A:
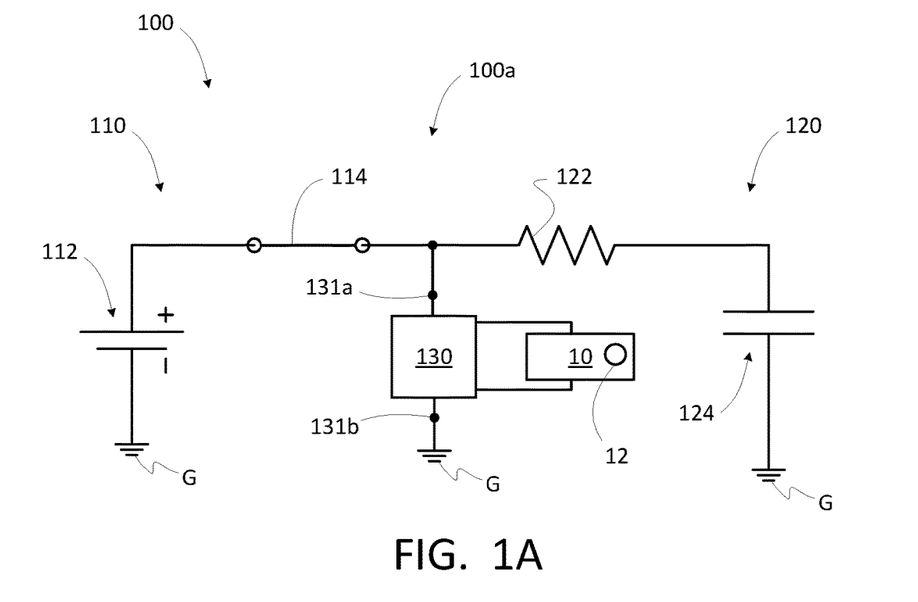
FIG. 1A is an electrical diagram of a driver for programmable particles, according to an embodiment of the present invention, shown in a charging state.
Figure 1B:
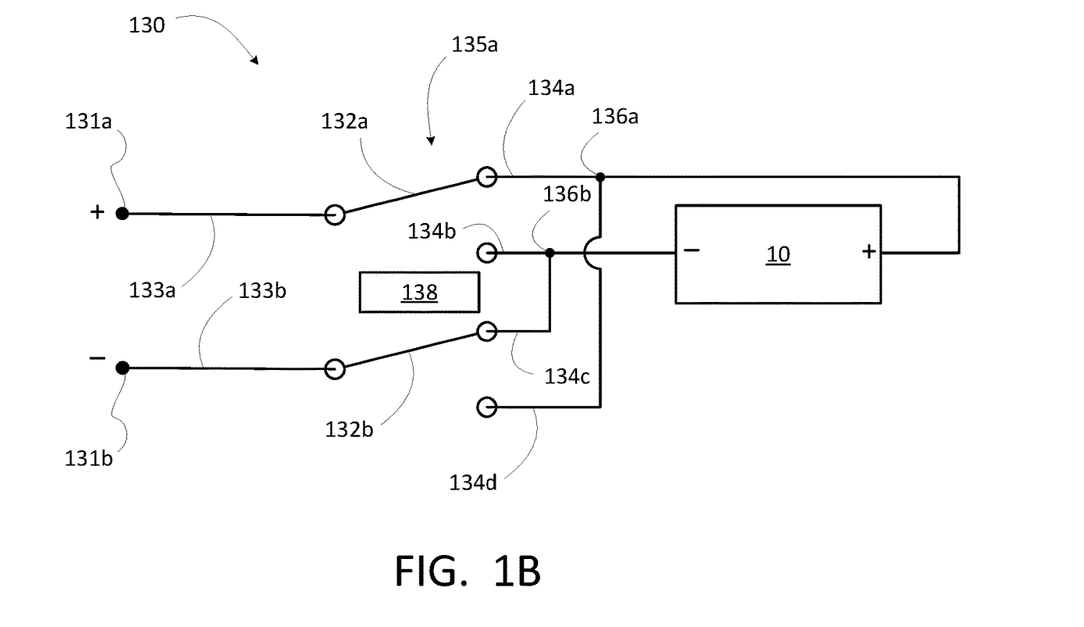
FIG. 1B is an electrical diagram further illustrating a current switching mechanism of the driver of FIG. 1A, shown in the charging state.
Figure 2A:
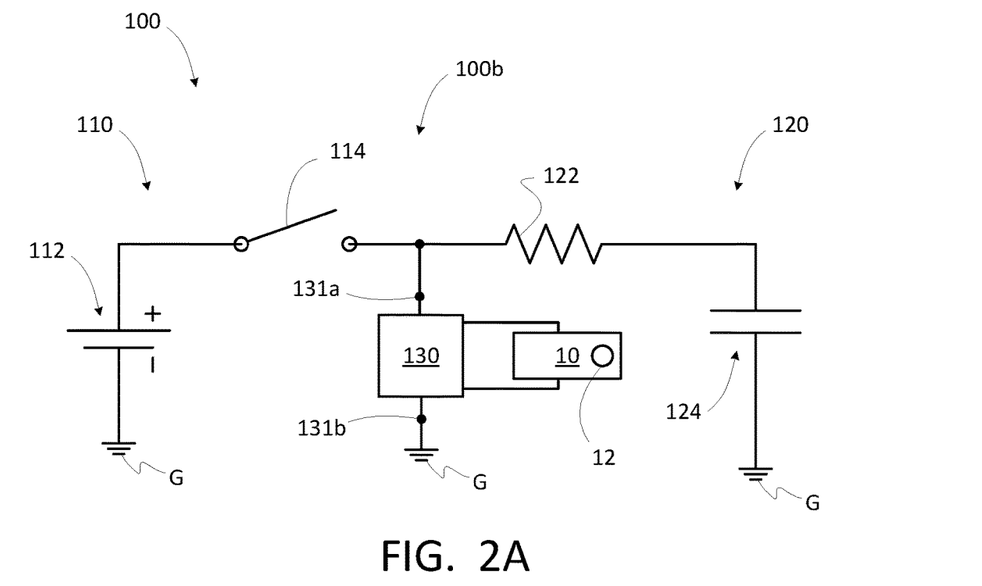
FIG. 2A is an electrical diagram of the driver of FIG. 1A, shown in a discharging state.
Figure 2B:
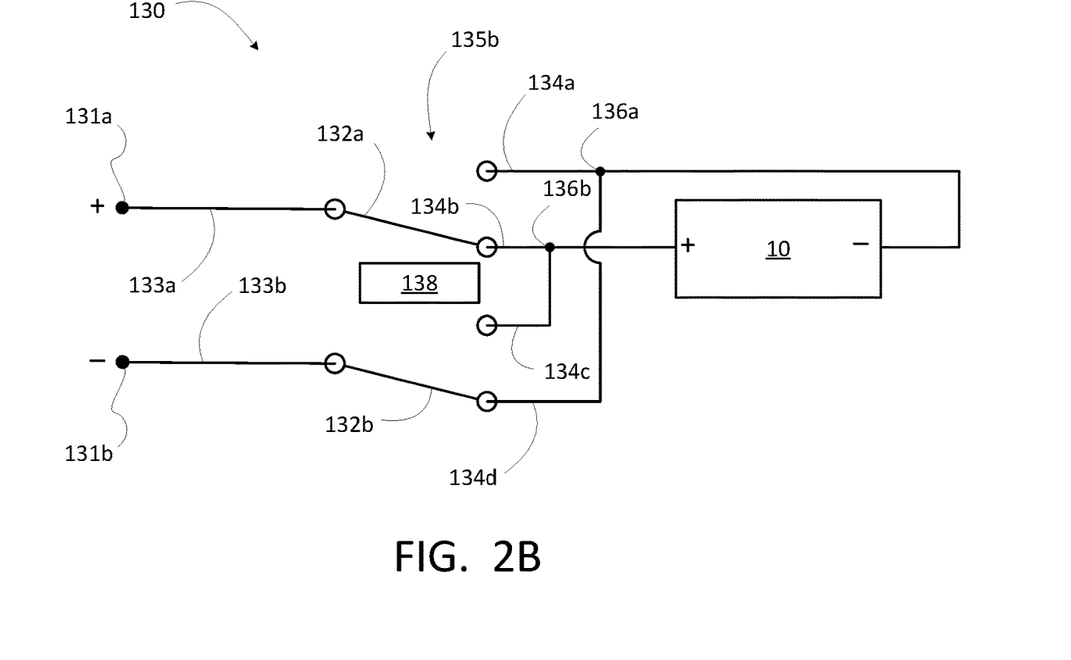
FIG. 2B is an electrical diagram of the current switching mechanism of FIG. 1B, shown in the discharging state.

As seen in FIGS. 1A through 2B, an embodiment 100 of a driver (or "circuit") for a SPEC particle unit 10 broadly includes a power input 110, a power return system 120, and a current switching mechanism 130, and the various elements are shown tied to ground G. The SPEC particle unit 10 includes at least one SPEC particle 12, and may typically contain many SPEC particles 12. FIGS. 1A and 1B show the driver 100 in a charging state 100a, and FIGS. 2A and 2B show the driver 100 in a discharging state 100b.

The power input 110 has a power supply 112 (e.g., a battery or an alternating current power supply) and a relay 114, and the power return system 120 has at least one resistor 122 and at least one energy storage unit 124. While this document shall often refer to elements in the singular, those skilled in the art will appreciate that multiple such elements may often be employed and that the use of multiple such elements which collectively perform as expressly or inherently disclosed is fully contemplated herein.

The energy storage unit 124 provides electricity for the current switching mechanism 130 to automatically alter the SPEC particle unit 10 after electricity from the power input 110 is cut off, as described in additional detail below, and the energy storage unit 124 may be any suitable energy storing device. For example, the energy storage unit 124 may be an inductor and/or a capacitor. A capacitor typically has two or more parallel conducting plates separated by a non-conductive region, called a dielectric, which may be filled with a medium such as air, a vacuum, or another electrically insulating material. A capacitor is generally referenced below in conjunction with the energy storage unit 124, though those of ordinary skill in the art will appreciate the use of inductors and/or other energy storing devices as well.

The capacitor 124 functions by having a voltage difference applied to it, such as from the power supply 112, and charge may "build up" on one plate of the capacitor 124. This buildup of charge may induct a flow of charge through the non-conductive region to the other conducting plate, which then may begin a buildup of charge opposite in polarity. Some period of time after a voltage difference has been applied to the capacitor 124, the buildup of net opposite charge may increase to the point where there is a voltage difference across the capacitor 124 generally equal to the voltage difference of the power supply 112. The capacitor 124 then acts as a break in the overall circuit 100, and charge may no longer flow through the capacitor 124. Once the power supply 112 is disconnected from the capacitor 124, the buildup of charge across the capacitor's conducting plates is released. This discharge may act as another power supply itself, creating a flow through the circuit 100 in the opposite direction of the flow from the power supply 112 and causing the current switching mechanism 130 to alter the SPEC particle unit 10 without additional input from a user.

The current switching mechanism 130 is coupled to the power input 110 and the power return system 120 by leads 131a, 131b. As shown in FIGS. 1B and 2B, the current switching mechanism 130 may include a Double Pull Changeover (DPCO) switch to reverse polarity of an electrical signal being supplied. A traditional functional circuit for a DPCO switch is also known as an H-Bridge. More particularly, the current switching mechanism 130 has two switches 132a, 132b with two input paths (e.g., wires) 133a, 133b and four output paths (e.g., wires) 134a, 134b, 134c, 134d. The switch inputs 133a, 133b are each connected separately to the positive and negative input leads 131a, 131b, and each switch 132a, 132b remains in contact with its respective input lead 131a, 131b. But each switch 132a, 132b changes its output wire 134a, 134b, 134c, 134d when the switches 132a, 132b are thrown, or forced to change position. The switches 132a, 132b preferably change position in tandem when thrown (e.g., between a first position 135a and a second position 135b), with the switch 132a being connected to the wire 134a when the switch 132b is connected to the wire 134c, and the switch 132a being connected to the wire 134b when the switch 132b is connected to the wire 134d.

The output wires 134a, 134b, 134c, 134d are each connected to the SPEC particle unit 10, in a configuration to complete a connection through the SPEC particle unit 10 in either of the switch positions 135a, 135b. More particularly, the output wires 134a, 134b, 134c, 134d are arranged to be cross connected to terminals 136a, 136b in electrical communication with the SPEC particle unit 10. This cross connection allows the positive and negative input leads 131a, 131b to selectively be in connection with the opposite electrical ends of the SPEC particle unit 10 from which they were previously in connection with, with the positions of the switches 132a, 132b (i.e., the first position 135a and the second position 135b) dictating the direction of current flow to the SPEC particle unit 10.

An actuator 138 (e.g., at least one electromagnetic relay, and/or at least one solid state relay, et cetera) is configured to alter the switches 132a, 132b between the positions 135a, 135b. For example, an electromagnetic actuator 138 may include a coil of wire wrapped around a soft iron core (generally referred to as a solenoid or relay coil), an iron "yoke" to provide reluctance to the magnetic flux, a movable iron armature, a spring, and one or more contact points. The armature may be held in place to one contact by a spring, and when a charge moves through the solenoid a magnetic field generated by the moving charge may pull the armature to the other contact point. This provides a method to throw the switches 132a, 132b between the positions 135a, 135b using the electrical charges supplied by the power supply 112 and the energy storage unit 124.

The actuator 138 may also or alternately include at least one solid-state relay. An example solid state relay includes two or more circuits in galvanic isolation from each other, such that there is no direct flow of electricity from one to the other. One circuit may power a device, such as a light emitting diode (LED), whose light signal is received by a photo-sensitive diode (or transistor) on the other circuit. The photo-sensitive diode may then translate this signal to an actuating component, such as a thyristor, Semiconductor Controlled Rectifier (SCR), or a Metal-Oxide-Semiconductor Field-Effect Transistor (MOSFET). The actuating component then closes its circuit, throwing the switches 132a, 132b. In other embodiments, still other suitable relay types may be used. Solid-state relays and mechanical relays often contain contact switch elements in both normally-open (N.O. or Form A) and normally-closed (N.C. or Form B) modes of circuit operation. This concept is known as a Form C relay contact configuration. The presence of both N.O. and N.C. (Form C) contacts on the same device can allow simple, low-cost and fail-safe construction of an H-Bridge polarity inverting circuit.

The actuator 138 may be in electrical communication with the power supply 112 or the energy storage unit 124, and it may be particularly desirable for the actuator 138 to be in electrical communication with the power supply 112 to avoid using current from the energy storage unit 124. Accordingly, while the relay 114 is closed, the actuator 138 is powered and maintains the switches 132a, 132b at one of the positions 135a, 135b; and when the relay 114 is open, the actuator is unpowered and the switches 132a, 132b are allowed to return to the other of the positions 135a, 135b. If conserving power from the energy storage unit 124 is not a concern, the actuator 138 may be similarly connected to the energy storage unit 124 instead of to the power supply 112.

In one method of use, the SPEC particle unit 10 may replace an existing display that requires a constant supply of current to maintain a selected state. For example, the SPEC particle unit 10 may replace a segment on a seven segment LED display (or a nine segment display, a fourteen segment display, a sixteen segment display, et cetera), the power supply 112 may replace or be the power supply for the existing segmented display, and the relay 114 may replace or be the control output for the existing segmented display. As the existing controller outputs a signal to close the relay 114 such that the power supply 112 supplies power to the circuit 100 (FIGS. 1A and 1B), current from the power supply 112 charges the energy storage unit 124 and powers the actuator 138, which in turn maintains the switches 132a, 132b at the position 135a. Current then flows through the SPEC particle unit 10 in one direction, causing the SPEC particles 12 to orient such that one color (e.g., red or black) is visible. As the existing controller stops outputting a signal to close the relay 114, the relay 114 opens and the circuit 100 no longer receives current from the power supply 112. This causes the actuator 138 to release the switches 132a, 132b to remove to the position 135b. And current from the energy storage unit 124 passes through the SPEC particle unit 10 in the opposite direction, causing the SPEC particles 12 to orient in another direction such that another color (e.g., white) is visible. Thus, the SPEC particle unit 10 may be operated using prior controllers and may easily replace other display technologies. And, of course, embodiments may operate multiple SPEC particle units 10 by repeating and/or combining the disclosed embodiments, such that more intricate display technologies can be replaced (e.g., an entire segmented display instead of simply a segment of a segmented display).

Figure 3A:
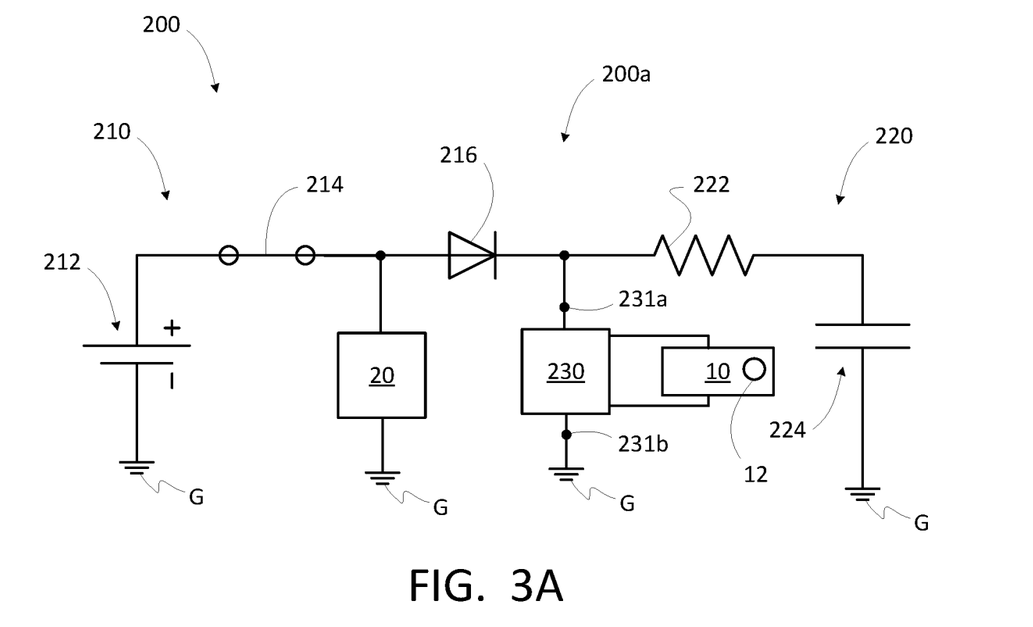
FIG. 3A is an electrical diagram of a driver for programmable particles, according to another embodiment of the present invention, shown in a charging state.
Figure 3B:
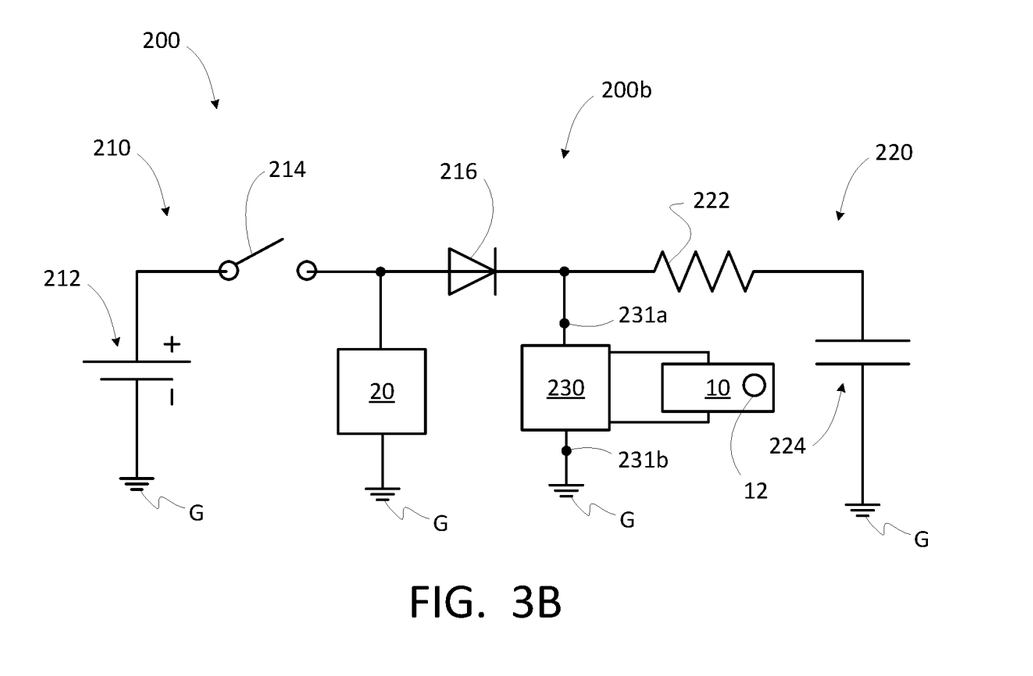
FIG. 3B is an electrical diagram of the driver of FIG. 3A, shown in the discharging state.

FIGS. 3A and 3B illustrate another driver 200 that is substantially similar to the embodiment 100, except as specifically noted and/or shown, or as would be inherent. Further, those skilled in the art will appreciate that the embodiment 100 (and thus the embodiment 200) may be modified in various ways, such as through incorporating all or part of any of the various described embodiments, for example. For uniformity and brevity, reference numbers 200 to 299 may be used to indicate elements corresponding to those discussed above numbered from 100 to 199 (e.g., charging state 200a corresponds generally to the charging state 100a; discharging state 200b corresponds generally to the discharging state 100b; power input 210 corresponds generally to the power input 110; power supply 212 corresponds generally to the power supply 112; relay 214 corresponds generally to the relay 114; power return system 220 corresponds generally to the power return system 120; resistor 222 corresponds generally to the resistor 122; energy storage unit 224 corresponds generally to the energy storage unit 124; the current switching mechanism 230 corresponds generally to the current switching mechanism 130; and leads 231a, 231b correspond generally to the leads 131a, 131b), though with any noted, shown, or inherent deviations.

In embodiment 200, the driver 200 is configured to operate both the SPEC particle unit 10 as well as another display unit 20 (e.g., an LED display, an incandescent-backlit display, an ELD display, a PDP display, an LCD display, an HPA display, a TFT display, an OLED display, a DLP display, a CRT display, a current seven-segment display, et cetera). A diode 216 or other suitable component for allowing current to flow in only one direction is part of the power input 210. The diode 216 is positioned to prevent the other display unit 20 from receiving an unnecessary, and in fact counterproductive, electrical signal after the power supply 212 is disconnected.

In one method of use, the SPEC particle unit 10 may supplement an existing display unit 20 that requires a constant supply of current to maintain a selected state. By implementing both the SPEC particle unit 10 along with the different type of display unit 20, the two displays may be able to overcome each other's disadvantages in certain systems. For example, the SPEC particle unit 10 may be used to show different colors of a streetlight, and a small LED display unit 20 may be used to provide a backlight (which may be particularly useful in dark operational periods); and together, the system may use less electricity overall compared to using just a large LED display.

As another example, the SPEC particle unit 10 may be used in addition to an automobile's regular LED or incandescent backlit taillight display 20. The driver 200 may be configured to turn the SPEC particle unit 10 red when the automobile's brakes are applied and non-red (e.g., white) once the brakes are released. Here, the brakes act as (or are connected with) switch 214. If the automobile's traditional taillight display 20 were to burn out or otherwise fail, the electronic paper display 10 may still be able to acceptably perform the function of a taillight.

Focusing on the driver 200 in use with a traditional LED taillight display 20, the SPEC particle unit 10 may be a plurality of SPEC particles 12 capable of shifting between red and white. The SPEC particles 12 may be positioned in front of, behind, adjacent to, or otherwise separated from the LED taillight display 20, and the vehicle's brake pedal may act as (or be connected with) the relay 214. As the existing controller outputs a signal to close the relay 214 such that the power supply 212 (e.g., a vehicle battery) supplies power to the circuit 200, current from the power supply 212 powers the display 20 and charges the energy storage unit 224, powers the actuator, and operates the SPEC particle unit 10 as generally described above regarding the driver 100. The SPEC particles 12 are turned to present a red appearance while the brakes are applied (i.e., while the LED taillight display 20 is actuated), and a white appearance while the brakes are released (i.e., while the LED tail light display 20 is not actuated). And the diode 216 prevents the current from the power supply 212 from undesirably powering the LED taillight display 20.

Figure 4A:
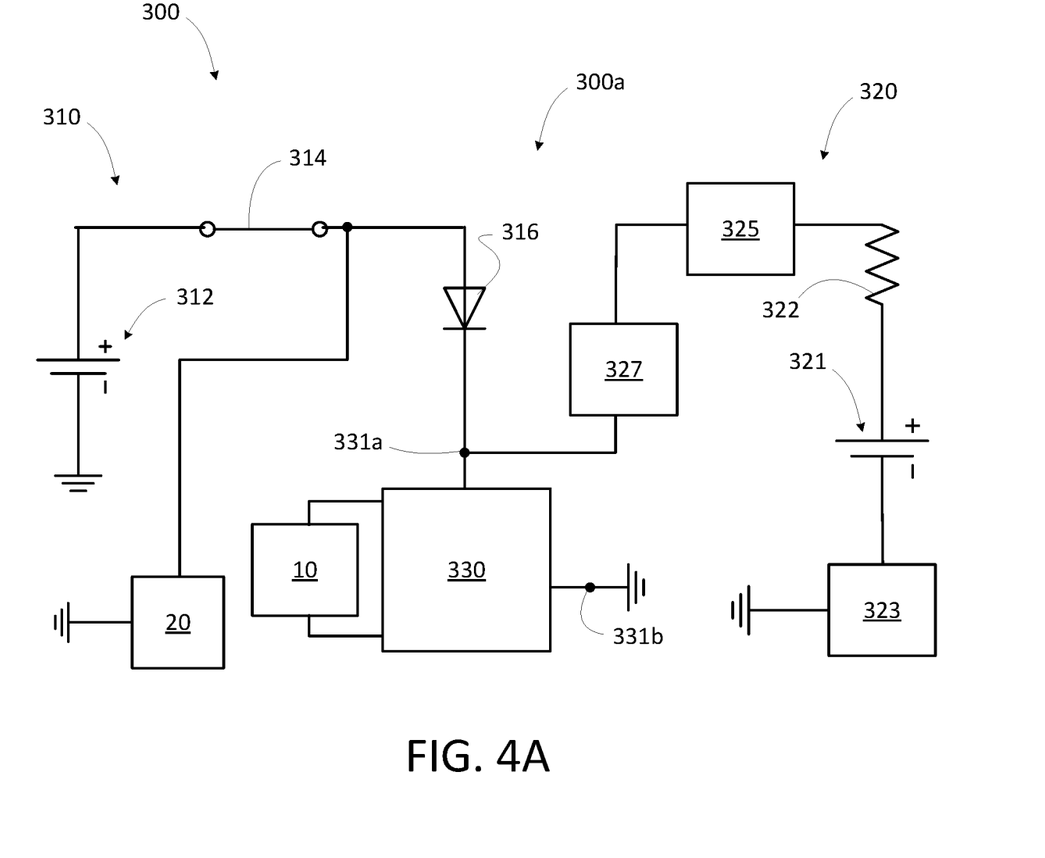
FIG. 4A is an electrical diagram of a driver for programmable particles, according to yet another embodiment of the present invention, shown in a charging state.
Figure 4B:
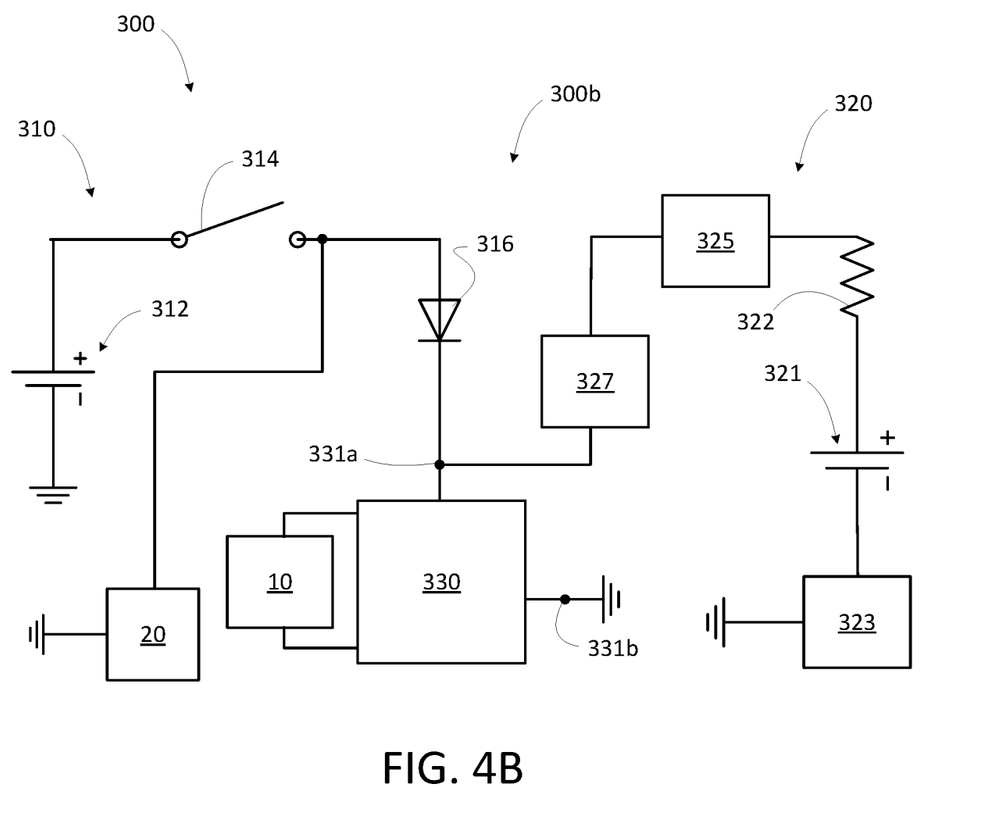
FIG. 4B is an electrical diagram of the driver of FIG. 4A, shown in the discharging state.
Figure 5:
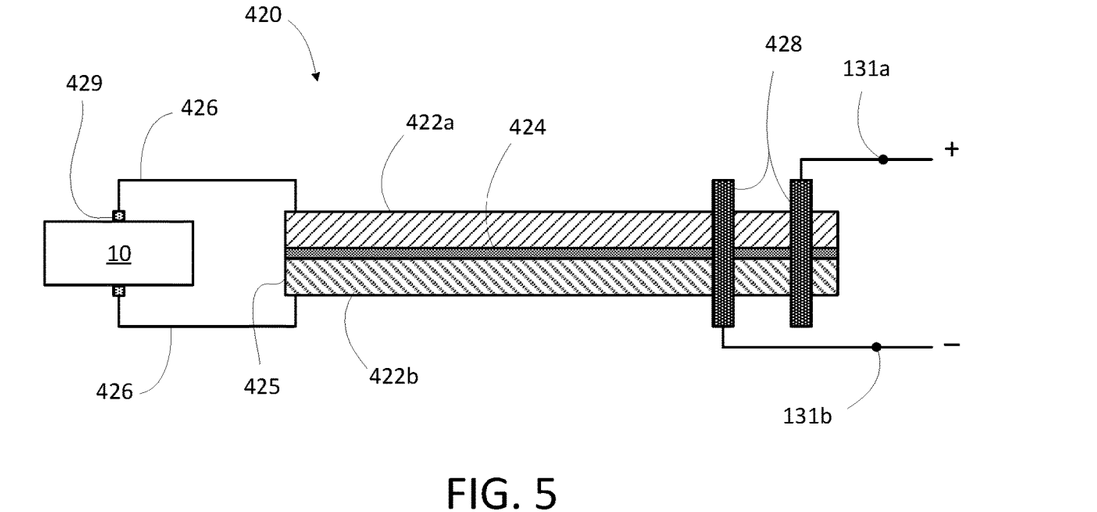
FIGS. 5 and 6 are schematic illustrations of a current switching mechanism according to another embodiment of the present invention.
Figure 6:
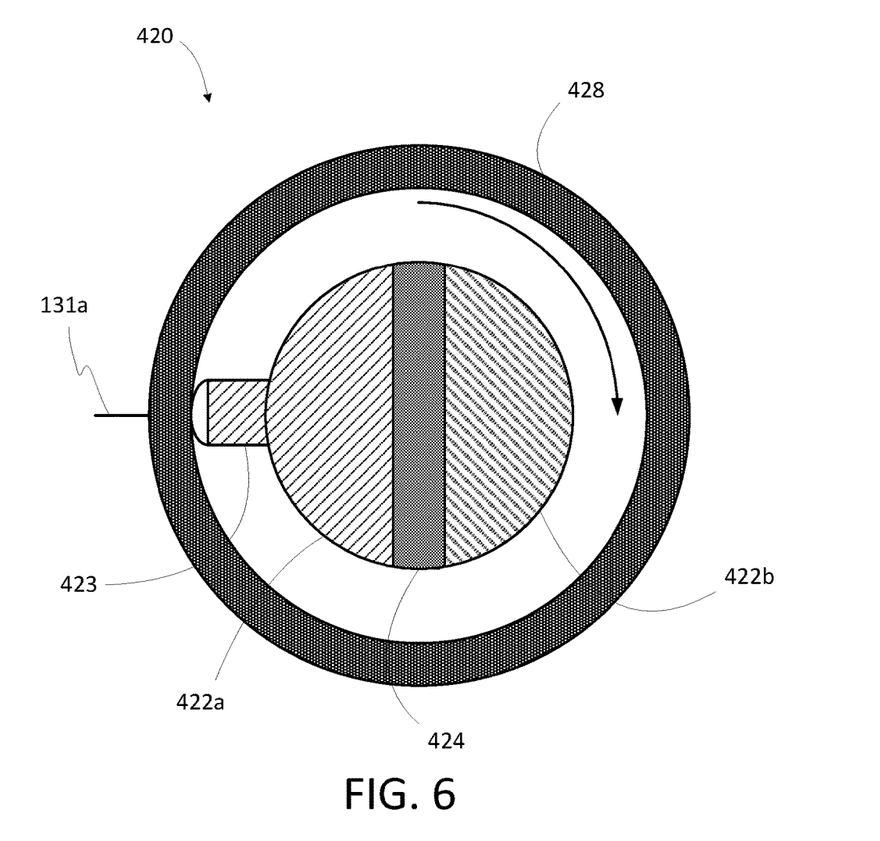
Figure 7A:
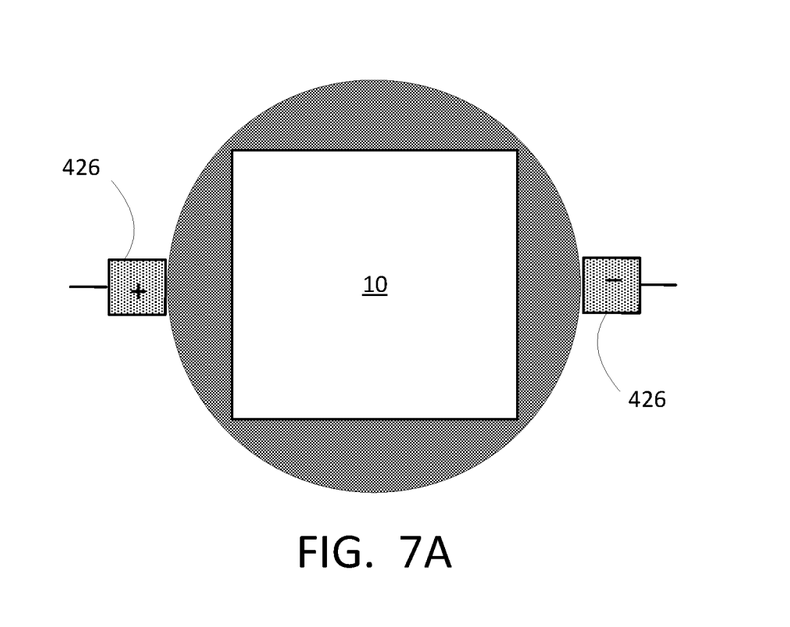
FIGS. 7A and 7B illustrate the current switching mechanism of FIG. 5 at different orientations.
Figure 7B:
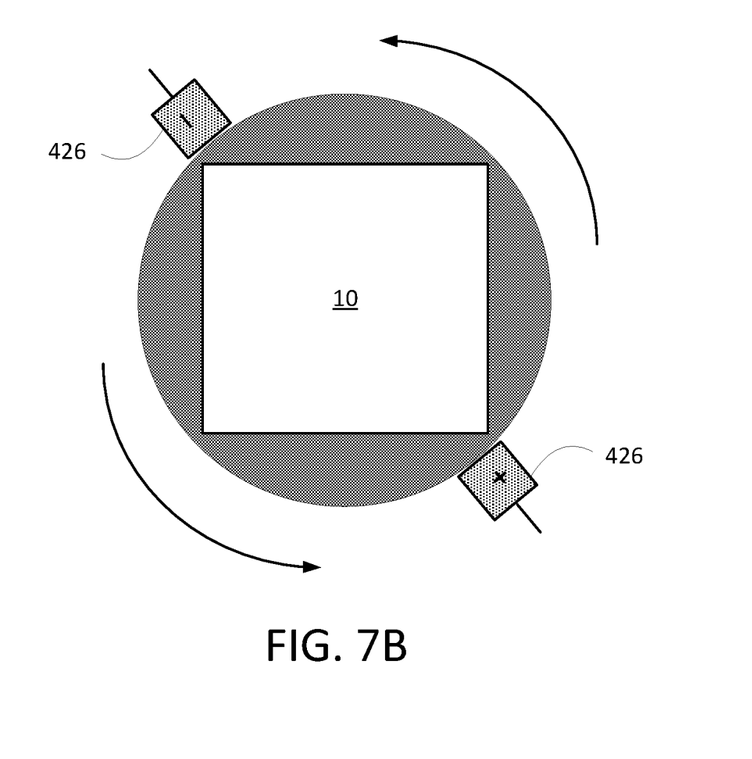

FIGS. 4A and 4B illustrate another driver 300 that is substantially similar to the embodiment 200, except as specifically noted and/or shown, or as would be inherent. Further, those skilled in the art will appreciate that the embodiment 200 (and thus the embodiment 300) may be modified in various ways, such as through incorporating all or part of any of the various described embodiments, for example. For uniformity and brevity, reference numbers 300 to 399 may be used to indicate elements corresponding to those discussed above numbered from 200 to 299 (e.g., charging state 300a corresponds generally to the charging state 200a; discharging state 300b corresponds generally to the discharging state 200b; power input 310 corresponds generally to the power input 210; power supply 312 corresponds generally to the power supply 212; relay 314 corresponds generally to the relay 214; diode 316 corresponds generally to the diode 216; power return system 320 corresponds generally to the power return system 220; resistor 322 corresponds generally to the resistor 222; the current switching mechanism 330 corresponds generally to the current switching mechanism 230; and leads 331a, 331b correspond generally to the leads 231a, 231b), though with any noted, shown, or inherent deviations.

In embodiment 300, the power return system 320 operates without receiving power from the power supply 312 and includes a secondary power supply (e.g., a battery or an alternating current power supply). The secondary power supply 312 is shown with components (e.g., timing and delay components 323, 325 and a transistor 327) for allowing the secondary power supply 312 to provide current to the current switching mechanism 130 to alter the SPEC particle unit 10 without additional input from a user.

FIGS. 5-7B illustrate a current switching mechanism 420 that may be used with various embodiments of the current invention instead of the current switching mechanism 120 described above. For convenience, the current switching mechanism 420 is discussed in use with the embodiment 100.

The current switching mechanism 420 has a commutator 422 configured to rotate when delivering power from the power return system 120. The commutator 422 may have a body made up of at least two conducting segments 422a, 422b separated by an insulating material 424, a first end portion 425 connected to two armatures 426, and a second end portion 427 that is coupled to each the positive and negative main leads 131a, 131b via separate slip rings 428. Each segment 422a, 422b may have a contact 423 (e.g., brush, bearing, et cetera) fixedly attached, and each contact 423 may be configured to make constant electrical contact with its respective slip ring 428. Each slip ring 428 may in turn be electrically connected to a separate main lead 131a, 131b. And the commutator's rotation may be controlled by a processing unit, such as, for example, a microcontroller.

A respective armature 426 may be fixedly attached to each conducting segment 422a, 422b of the commutator 422, and may make electrical connection with a contact region 429 of the SPEC particle unit 10. In operation, the armatures 426 may switch which portion of the contact region 429 of the SPEC particle unit 10 they are in electrical connection with, while the slip rings 428 remain in contact with the same main leads 431a, 431b, effectively reversing the electric signal to the SPEC particle unit 10 when the commutator 422 rotates. The armatures 426 may make an electrical connection with the contact region 429 at multiple angles of commutator rotation.

In embodiments, all or part of the functionality of the driver (e.g., the driver 100, the driver 200, the driver 300, et cetera) may be effectuated using machine-readable instructions. For instance, the driver may be implemented as a system-on-chip or via a single board or other computer.

Figure 8A:
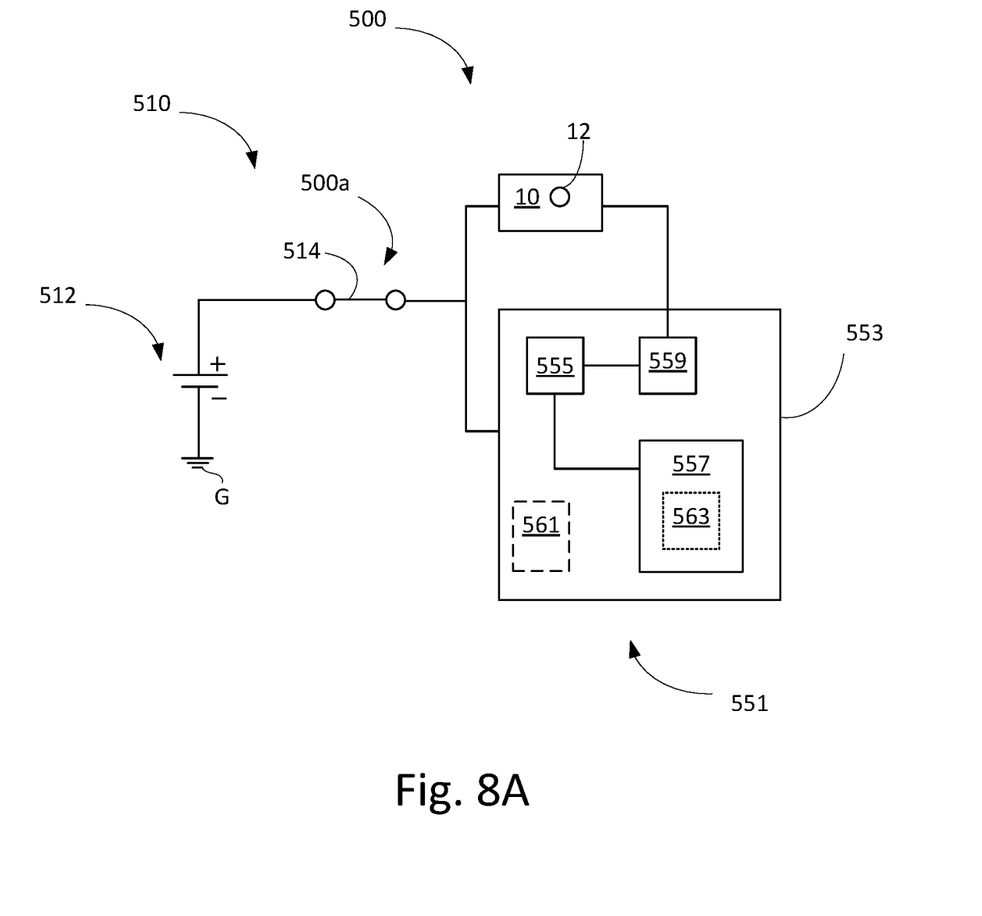
FIG. 8A is a schematic illustration of a computer-implemented driver for programmable particles, according to still another embodiment of the current invention, shown in a charging state.
Figure 8B:
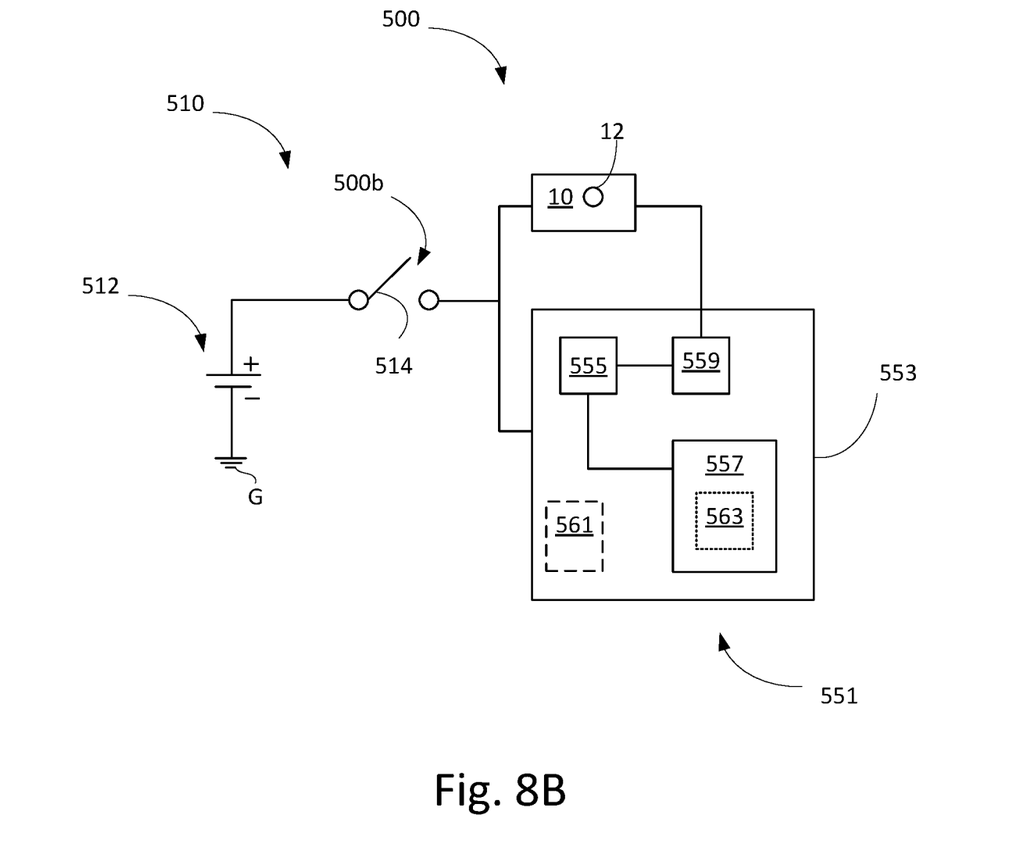
FIG. 8B is a schematic illustration of the computer-implemented driver of FIG. 8A, shown in the discharging state.

FIGS. 8A-8B illustrate a computer-implemented driver 500 that is similar to driver 100, except as specifically noted and/or shown, or as would be inherent. Those skilled in the art will appreciate that the embodiment 100 (and thus the embodiment 500) may be modified in various ways, such as through incorporating all or part of any of the various described embodiments, for example. For uniformity and brevity, reference numbers 500 to 599 may be used to indicate elements corresponding to those discussed above numbered from 100 to 199 (e.g., the charging state 500a corresponds generally to the charging state 100a; discharging state 500b corresponds generally to the discharging state 100b; power input 510 corresponds generally to the power input 110; power supply 512 corresponds generally to the power supply 112; relay 514 corresponds generally to the relay 114), though with any noted, shown, or inherent deviations. A primary difference between the driver 500 and the driver 100 may be that the power return system and the switching mechanism of the driver 500 may be implemented using a computing system 551. The illustrated computing system 551 is located on a solitary board 553 (e.g., a PCB board), but such, as noted, is merely exemplary.

The computing system 551 may comprise a processor 555 in communication with each of memory 557 and electronics 559. The processor 555 represents a digital processor and may include any suitable processor or processors. In embodiments, part or all of the memory 557 may be integrated into processor 555. In some embodiments, the processor 555 may be configured through particularly configured hardware, such as an application specific integrated circuit (ASIC), field-programmable gate array (FPGA), et cetera, and/or through execution of software to perform functions of the driver 500 as set forth herein.

Memory 557 represents one or both of volatile memory (e.g., SRAM, DRAM, computational RAM, other volatile memory, or any combination thereof) and non-volatile memory (e.g., FLASH, ROM, magnetic media, optical media, other non-volatile memory, or any combination thereof). The memory 557 may include particle switching software 563, which may be stored in a transitory and/or a non-transitory portion of the memory 557. Software 563 includes machine readable instructions that are executed by processor 555 to selectively control the state of the SPEC particles 12 in the SPEC unit 10.

The electronics 559 may include one or more discrete electronic components, such as a resistor (e.g., a light dependent, temperature dependent, or other resistor), an amplifier, a transistor (e.g., an NPN or PNP transistor, N-Channel or P-Channel FET), a switch (e.g., a single-pole-single-throw, a single-pole-double-throw, a double pull changeover, a push-to-break, relay, contactor, or other switch), a diode, an actuator, an energy storage device (e.g., a capacitor, an inductor, or other energy storage device), et cetera.

The power supply 512 may be communicatively coupled to each of the SPEC particle unit 10 and the board 553 via the relay 514. When the existing controller outputs a signal to close the relay 514 (FIG. 8A), current may flow through the SPEC particle unit 10 in one direction, and may, in tandem, power the board 553. The particle switching software 563 may direct the processor 555 to use the current from the power supply 512 to charge the energy storage device of the electronics 559. When the existing controller stops outputting a signal and the relay 514 opens (FIG. 8B), the particle switching software 563 may direct the processor 555 to cause current to flow from the electronics 559 to the SPEC particle unit 10 in the opposite direction, thereby reversing the orientation of the SPEC particles 12. Care may be taken in the selection of the energy storage device of the electronics 559 to ensure the energy storage device holds sufficient charge and functional timing to temporarily power the board 553 for the reorientation of the SPEC particles 12.

The machine-readable instructions 563 may be altered in view of the application. Such may allow for drivers with robust and varying functionality to be rapidly developed into low-cost embodiments. For example, the computing system 551 may be used to program a delay in switching of the particles 12 when a condition is met or goes unmet, may be used to override the switching operation when a condition is met or goes unmet, may be used to stagger the switching of the particles 10 over a time period, may be used to allow for prioritizing the switching of different types of particles 10 based on user-selected criteria, et cetera.

In some embodiments, the board 553 may include a local battery 561; alternately, the local battery 561 may be omitted. The local battery 561, where provided, may be a lithium battery, a lithium-ion battery, a nickel-cadmium battery, super-capacitor, et cetera. The local battery 561 may, in embodiments, be rechargeable (e.g., may be charged in a wired and/or wireless manner) or disposable.

The local battery 561 may be used to power the board 553. In these embodiments, the energy storage device of the electronics 559 may be omitted and power from the local battery 561 may be used to reorient the SPEC particles 12 in response to the opening of the relay 514. In other embodiments, e.g., in applications where safety is a concern, the local battery 561 may serve as a backup to the energy storage device (i.e., the local battery 561 may be used to reorient the SPEC particles 12 where the useful life of the energy storage device is depleted). In some embodiments, it may be preferable to omit the local battery 561 and employ only power provided by the power supply 512 and an associated energy storage device.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims.

The invention claimed is:

1. A display system, comprising:
   a current-essential (CE) display having an activated state and a deactivated state, the CE display only remaining in an activated state while receiving current;
   a CE power supply in electrical communication with the CE display for selectively providing current to the CE display to alter the CE display between the activated and deactivated states;
   a static programmable electro-chromic (SPEC) particle presenting a first appearance upon receiving current in a first direction and a second appearance upon receiving current in a second direction, the first appearance being different from the second appearance, the second direction being different from the first direction, the SPEC particle changing appearance only upon receiving a change in current direction, the SPEC particle being in electrical communication with a power source selected from the group consisting of the CE power supply and a separate SPEC power supply;
   a current switching mechanism in electrical communication with the SPEC particle for selectively changing the direction of current received by the SPEC particle between the first direction and the second direction;
   a power return system in electrical communication with the current switching mechanism and the SPEC particle for selectively providing current to the current switching mechanism and the SPEC particle; and
   an input having a first condition and a second condition;
   wherein the input being at the first condition causes:
      the CE power supply to provide current to the CE display;
      the CE display to remain in the activated state;
      the SPEC particle to receive current from the power source in the first direction; and
      the SPEC particle to present the first appearance; and
   wherein the input being at the second condition causes:
      the CE power supply to not provide current to the CE display;
      the CE display to be in the deactivated state;
      the SPEC particle to receive current from the power return system in the second direction; and
      the SPEC particle to present the second appearance.

2. The display system of claim 1, wherein the power return system stores power received from the power source.

3. The display system of claim 1, wherein the power source is the CE power supply, and wherein the power return system stores power received from the CE power supply.

4. The display system of claim 1, wherein the power return system does not receive power from the power source.

5. The display system of claim 1, wherein the current switching mechanism is operated by a computer.

6. The display system of claim 1, wherein the current switching mechanism includes a double pull changeover switch.

7. The display system of claim 1, wherein the current switching mechanism includes a rotating commutator.

8. The display system of claim 1, wherein the CE display includes an LED.

9. The display system of claim 1, wherein the SPEC particle is a plurality of SPEC particles.

10. A display system, comprising:
    a static programmable electro-chromic (SPEC) particle presenting a first appearance upon receiving current in a first direction and a second appearance upon receiving current in a second direction, the first appearance being different from the second appearance, the second direction being different from the first direction, the SPEC particle changing appearance only upon receiving a change in current direction;
    a power supply in electrical communication with the SPEC particle;
    a current switching mechanism in electrical communication with the SPEC particle for selectively changing the direction of current received by the SPEC particle between the first direction and the second direction;
    a power return system in electrical communication with the current switching mechanism and the SPEC particle for selectively providing current to the current switching mechanism and the SPEC particle; and
    an input having a first condition and a second condition;
    wherein the input being at the first condition causes:
       the SPEC particle to receive current from the power source in the first direction; and
       the SPEC particle to present the first appearance; and
    wherein the input being at the second condition causes:
       the SPEC particle to receive current from the power return system in the second direction; and
       the SPEC particle to present the second appearance.

11. The display system of claim 10, wherein the power return system stores power received from the power source.

12. The display system of claim 10, wherein the power return system does not receive power from the power source.

13. The display system of claim 10, wherein the current switching mechanism is operated by a computer.

14. The display system of claim 10, wherein the current switching mechanism includes a double pull changeover switch.

15. The display system of claim 10, wherein the current switching mechanism includes a rotating commutator.

16. A driver for a static programmable electro-chromic (SPEC) particle, the driver being operable with an input for a current-essential display having an activated state and a deactivated state and only remaining at the activated state when receiving current, the driver comprising:
    a current switching mechanism in electrical communication with the SPEC particle for selectively changing a direction of current received by the SPEC particle between a first direction and a second direction;
    a power return system in electrical communication with a power source for storing energy received from the power source, the power return system being in electrical communication with the current switching mechanism and the SPEC particle for selectively providing current to the current switching mechanism and the SPEC particle;

a processor causing:
- when the input signals for the activated state, the SPEC particle to receive current from the power source in the first direction such that the SPEC particle presents a first appearance; and
- when the input signals for the deactivated state, the SPEC particle to receive current from the power return system in the second direction such that the SPEC particle presents a second appearance.

17. The driver of claim 16, wherein the current switching mechanism includes a double pull changeover switch.

18. The driver of claim 16, wherein the current switching mechanism includes a rotating commutator.

19. A driver for a static programmable electro-chromic (SPEC) particle, the driver being operable with an input for a current-essential display having an activated state and a deactivated state and only remaining at the activated state when receiving current, the driver comprising:

a power return system in electrical communication with a power source for storing energy received from the power source, the power return system being in electrical communication with the SPEC particle for selectively providing current to the SPEC particle;

means for causing, when the input signals for the activated state, the SPEC particle to receive current from the power source in a first direction such that the SPEC particle presents a first appearance; and means for causing, when the input signals for the deactivated state, the SPEC particle to receive current from the power return system in a second direction such that the SPEC particle presents a second appearance.

20. A method of modifying a display system having a power source, a current-essential (CE) display, and an input having signals for changing the CE display between an activated state and a deactivated state; the method comprising:

providing a static programmable electro-chromic (SPEC) particle; and providing a driver comprising:
a current switching mechanism in electrical communication with the SPEC particle for selectively changing a direction of current received by the SPEC particle between a first direction and a second direction;

a power return system in electrical communication with the current switching mechanism and the SPEC particle for selectively providing current to the current switching mechanism and the SPEC particle;

a processor having programming causing:
- when the input signals for the activated state, the SPEC particle to receive current from the power source in the first direction such that the SPEC particle presents a first appearance; and
- when the input signals for the deactivated state, the SPEC particle to receive current from the power return system in the second direction such that the SPEC particle presents a second appearance.

21. The method of claim 20, wherein the power return system is in electrical communication with the power source for storing energy received from the power source.

* * * * *

UNITED STATES PATENT AND TRADEMARK OFFICE
CERTIFICATE OF CORRECTION

PATENT NO. : 11,194,216 B1
APPLICATION NO. : 16/449927
DATED : December 7, 2021
INVENTOR(S) : Fielding B. Staton and David Strumpf It is certified that error appears in the above-identified patent and that said Letters Patent is hereby corrected as shown below:

In the Specification

Column 5, Line 40: "Pull" should be replaced with --Pole--.
Column 10, Line 19: "pull" should be replaced with --pole--.

In the Claims

Claim 6, Column 12, Line 6: "pull" should be replaced with --pole--.
Claim 14, Column 12, Line 51: "pull" should be replaced with --pole--.
Claim 17, Column 13, Line 14: "pull" should be replaced with --pole--.

Signed and Sealed this
Twenty-first Day of November, 2023

Katherine Kelly Vidal
*Director of the United States Patent and Trademark Office*